US012807540B2

(12) United States Patent
Marshall et al.

(10) Patent No.: US 12,807,540 B2
(45) Date of Patent: Nov. 24, 2026

(54) DRY PREFORM BONDING FOR INTERNAL CHANNELED REACTION BONDED CERAMICS

(71) Applicant: II-VI DELAWARE, INC., Wilmington, DE (US)

(72) Inventors: Andrew Marshall, Elkton, MD (US); Sean McAnany, West Chester, PA (US); Samuel Salamone, Philadelphia, PA (US); Jiwen Wang, Mansfield Center, CT (US); Michael Aghajanian, Newark, DE (US)

(73) Assignee: II-VI Delaware, Inc., Wilmington, DE (US)

( * ) Notice: Subject to any disclaimer, the term of this patent is extended or adjusted under 35 U.S.C. 154(b) by 543 days.

(21) Appl. No.: 18/239,486

(22) Filed: Aug. 29, 2023

(65) Prior Publication Data

US 2025/0074832 A1 Mar. 6, 2025

(51) Int. Cl.

*C04B 37/00* (2006.01)
*C04B 35/565* (2006.01)
*C04B 38/00* (2006.01)

(52) U.S. Cl.

CPC .......... *C04B 37/003* (2013.01); *C04B 35/565* (2013.01); *C04B 38/0003* (2013.01); *C04B 2235/3826* (2013.01); *C04B 2235/6581* (2013.01)

(58) Field of Classification Search

CPC ................ C04B 37/003; C04B 37/005; C04B 2237/086; C04B 2237/365

See application file for complete search history.

(56) References Cited

U.S. PATENT DOCUMENTS

| | | | | |
|---|---|---|---|---|
| 12,054,439 | B2 * | 8/2024 | Salamone | C04B 41/5059 |
| 2008/0131665 | A1 * | 6/2008 | Suyama | B82Y 30/00 428/149 |
| 2010/0024975 | A1 * | 2/2010 | Hecht | C09J 7/21 428/327 |
| 2021/0331985 | A1 | 10/2021 | Salamone et al. | |
| 2022/0227676 | A1 | 7/2022 | Coppola et al. | |
| 2022/0251423 | A1 * | 8/2022 | Watanabe | C09J 153/02 |

FOREIGN PATENT DOCUMENTS

| | | | | | |
|---|---|---|---|---|---|
| CN | 106978121 | A | * | 7/2017 | C09J 11/04 |
| EP | 1930306 | A1 | | 6/2008 | |
| EP | 2924506 | A2 | * | 9/2015 | C04B 37/003 |
| GB | 1224521 | A | * | 3/1971 | B23P 15/04 |
| KR | 20180007142 | A | | 1/2018 | |
| WO | WO-2014133068 | A1 | * | 9/2014 | C04B 37/005 |
| WO | WO-2019240941 | A1 | * | 12/2019 | C04B 37/026 |

OTHER PUBLICATIONS

European Search Report, European Application No. 23219447.2, dated Jun. 19, 2024, 7 pages.

Official Communication pursuant to Rules 70(2) and 70a(2) EPC and reference to Rule 39(1) EPC, dated Mar. 10, 2025, 2 pages.

* cited by examiner

*Primary Examiner* — Noah S Wiese

(74) *Attorney, Agent, or Firm* — McAndrews, Held & Malloy, Ltd.

(57) ABSTRACT

A method of producing reaction bonded silicon carbide (RB—SiC) ceramic components containing internal channels is described. In some embodiments, methods as described herein may utilize diamond powder at the interface of two or more preformed sections.

15 Claims, 7 Drawing Sheets

Cross-Section of RB-SiC Flow-Through Part Made by Bonding Two Preform Halves with SiC-Based Glue and then Reaction Bonding [Excess Glue Bead Seen in Channel]

| Form of Carbon | Density (g/cc) | Volume of 1 mole of Carbon (Atomic Weight/Density) (12/density) | Volume of 1 Mole of SiC Created by Reaction with Infiltrated Si (Atomic Weight/Density) (40/3.21) | Volume Increase (%) |
|---|---|---|---|---|
| Carbon Black | 1.70 | 7.0 | 12.5 | 78% |
| Graphite | 2.25 | 5.3 | 12.5 | 136% |
| Diamond | 3.52 | 3.4 | 12.5 | 268% |

FIG. 4

Preform Halves Reaction Bonded with No Diamond at Interface
[Unacceptable Si Bond Line]

DRY PREFORM BONDING FOR INTERNAL CHANNELED REACTION BONDED CERAMICS

CROSS-REFERENCE TO RELATED APPLICATIONS/INCORPORATION BY REFERENCE

N/A

FIELD

Aspects of the present disclosure relate to ceramic components for the semiconductor industry. More specifically, certain embodiments of the disclosure relate to reaction bonded silicon carbide (RB—SiC) ceramic components that contain internal channels.

BACKGROUND

Conventional approaches for making ceramic components for the semiconductor industry may have issues, especially when including internal channels.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for making ceramic components for the semiconductor industry, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 4 is a table showing the characteristics of various forms of carbon, in accordance with an example embodiment of the disclosure.

DETAILED DESCRIPTION

Figure 1:
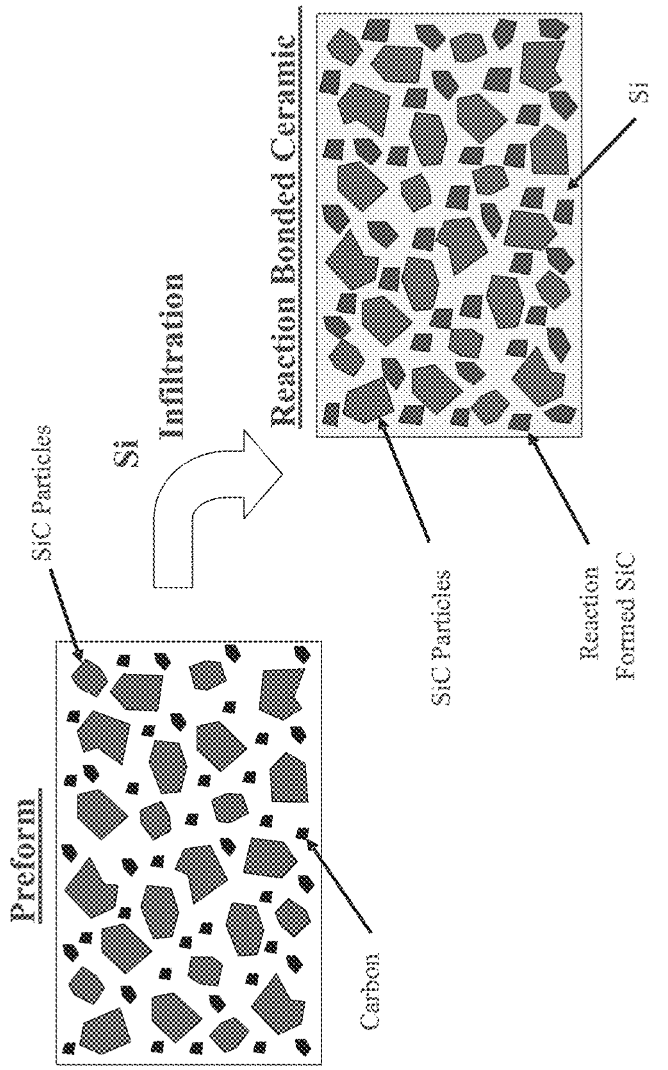
FIG. 1 is a diagram of reaction bonded silicon carbide, in accordance with an example embodiment of the disclosure.

Reaction bonded silicon carbide (RB—SiC) ceramic components containing internal channels are important to the semiconductor industry. Example components include, but are not limited to, water-cooled wafer tables, water-cooled collector mirrors and water-cooled high energy laser mirrors. Conventional parts may be made by forming preform pieces/portions (e.g., two preform halves) with surface channels, bonding the preform pieces with a SiC-based glue or adhesive (a caulk-like material) and thermal processing (such as, e.g., ceramic firing, reaction bonding, etc.) to yield a one-piece ceramic body finished component with internal channels.

During conventional preform bonding operations as described above, a slight bead of excess SiC-based glue may extrude into the channel in the finished component. If the channel size is large (5 to 10 mm), excess glue may not pose a problem. However, many next-generation designs have ultra-small channel sizes (e.g., <1 mm; in some embodiments, 0.25-1.0 mm or 0.5-1.0 mm). A bead of excess glue may restrict flow or even clog channels of this small size, making it difficult to produce parts with ultra-small channels. Thus, an alternative bonding method is needed.

RB—SiC pieces may be glass bonded to try to avoid the excess glue problem, but this type of bonding has poor corrosion resistance, poor thermal conductivity, poor electrical conductivity and/or poor elevated temperature strength.

This disclosure presents a method of forming a bond between silicon carbide (RB—SiC) ceramic components without using adhesives such as caulk-like SiC-based glue; therefore, no bead is formed that can clog a small channel. The bond is formed by placing dry diamond powder between two or more preform pieces and then reaction bonding the pieces to make a finished component. In some embodiments, there are two preform pieces; in further embodiments there are two preform halves. In other embodiments, there are more than two preform pieces. Upon reaction bonding of the preform pieces with each other (i.e., reactive infiltration with molten Si), the diamond powder expansively reacts with the Si to form SiC, via Si+C→SiC, leading to a bond line (i.e., interface) that is SiC rich and has most of the silicon reacted away. A robust bond line is formed without a glue bead that enters the channel. Benefits of this method of making may include (1) the ability to produce a bond line free of Si for enhanced corrosion resistance and properties; and/or (2) reduced fabrication labor. In some embodiments, the bond line has the majority (>50%) of the silicon reacted away; in other embodiments, 75% or more of the silicon is reacted away.

In the disclosed method, dry diamond powder is used, that is, the diamond powder is used neat with no further additives. In some embodiments, no vehicle or carrier is used for the diamond powder (i.e. no solvent). Additionally, the reaction bonding occurs under vacuum (which would remove any residual moisture such as from room humidity, etc.). In other embodiments, the reaction may be performed under inert atmosphere and/or in a humidity controlled environment.

The disclosed method uses no glue or adhesives and also avoids the issues presented with glass bonding or other bonding techniques.

FIG. 1 is a diagram of reaction bonded silicon carbide (RB—SiC, also called SiSiC). Referring to FIG. 1, reaction bonded SiC ceramics are produced by the reactive infiltration of molten Si into preforms of SiC+carbon. Upon infiltration, the molten Si reacts with the carbon to form additional SiC (Si+C→SiC), bonding the structure together. The final composite consists of the original SiC, reaction formed SiC and residual Si.

In the creation of reaction bonded silicon carbide (RB—SiC) ceramic components as described herein, preforms are utilized. A preform is created with a slurry (SiC+C based binder+Deionized $H_2O$) which is formed into the desired shape, including both internal and external features. The preforms can be made as green parts that are then manipulated further to end up with a finished ceramic component. In some embodiments, an internal channel is present in the finished component.

Figure 2:
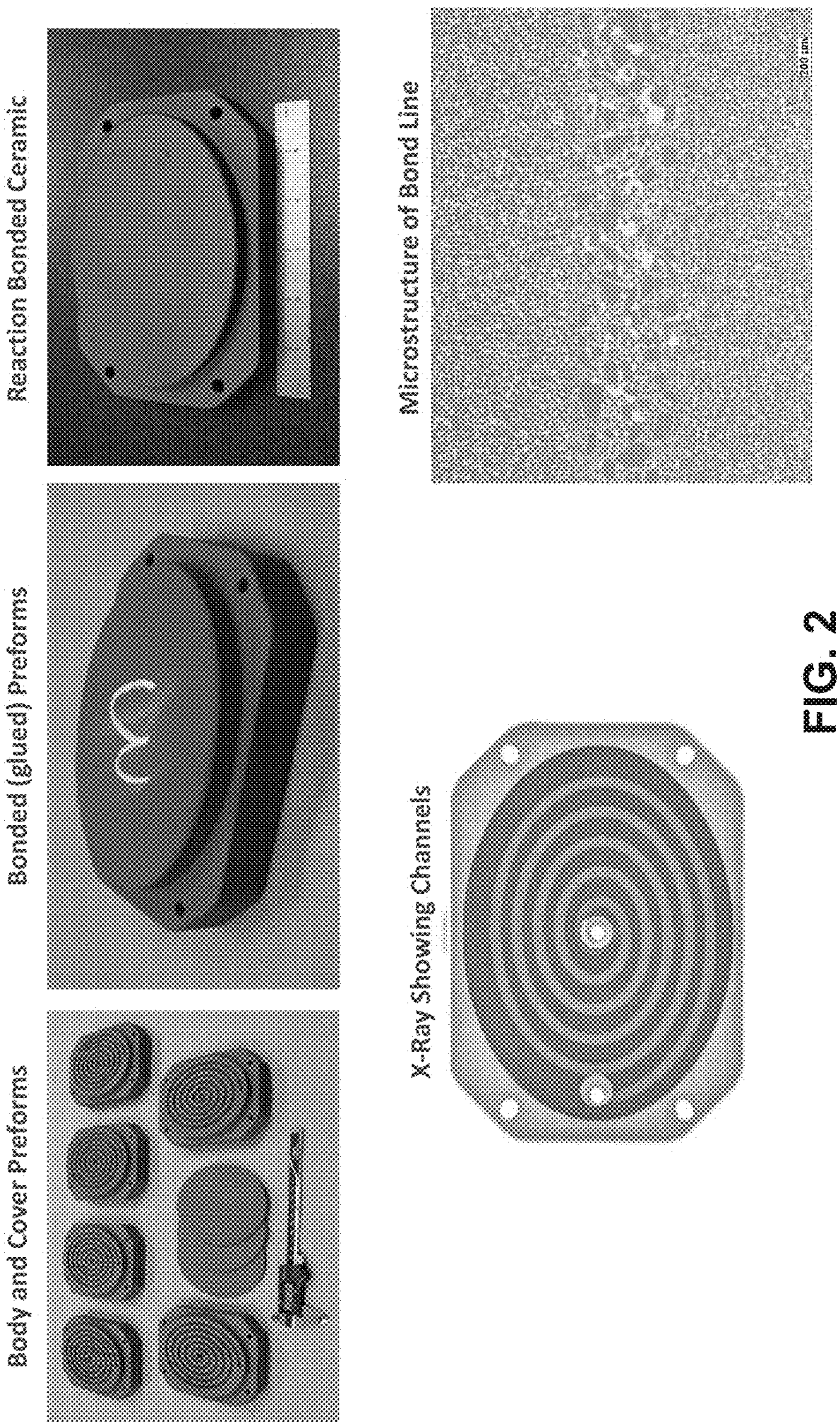
FIG. 2 shows exemplary preforms bonded with SiC-based glue, in accordance with an example embodiment of the disclosure.

FIG. 2 shows exemplary preforms bonded with SiC-based glue (caulk-like mixture of SiC particles and carbon-based additives). Specifically, these preform assemblies have been reaction bonded to yield ceramic components with internal channels by first gluing the two portions of the component, then performing the reaction bonding process. In some embodiments, the preform comprises a body portion and a cover portion, as seen in FIG. 2.

Also in FIG. 2, the microstructure of the bond line after preforms bonded with SiC-based glue is shown. The microstructure depicts a fully dense bond line indicative of a hermetically sealed part. This allows for fluids to be used to control the temperature of the part during use in a vacuum environment.

Figure 3:
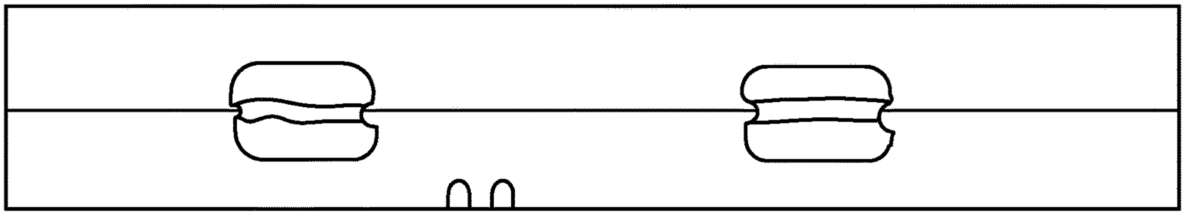
FIG. 3 illustrates a cross-section of RB—SiC flow-through part made by bonding two preform halves with SiC-based glue and then reaction bonding, in accordance with an example embodiment of the disclosure.

SiC-based glue for preform bonding may be formulated to have caulk-like consistency. This glue may comprise SiC powder, high carbon content organic liquid, and rheology modifier. In practice, more glue than is needed is applied to interface. This excess glue prevents any gaps in the bond line. However, the excess glue will extrude into the channel, forming a glue bead along the bottom, top and/or sidewall of the channel. This bead formed from the excess glue can affect flow characteristics, particularly in component designs with small channels (e.g., <1 mm, see above). FIG. 3 illustrates a cross-section of RB—SiC flow-through part made by bonding two preform halves with SiC-based glue and then reaction bonding. In FIG. 3, an excess glue bead can be seen in the channel.

Conventional reaction bonded SiC materials having internal channels are often assembled as follows: (1) Preforms are bonded with SiC-based glue; and (2) The preform assembly is reaction bonded to yield a flow-through ceramic (i.e. material having internal channels). As discussed above, an issue with conventional methods is that excess glue forms a bead extruding into the channel.

In the present disclosure, methods are disclosed to create reaction bonded silicon carbide (RB—SiC) ceramic components containing one or more internal channels that do not have excess material present in the channel. As such, the disclosed methods do not utilize a glue or adhesive. Instead, the method comprises the steps of joining (assembling) two or more preformed sections with dry diamond powder and reaction bonding the preformed sections. In the disclosed method the diamond reacts with the Si (while in conventional methods the SiC does not). In this method, the sections become bonded due to the Si+C (diamond)→SiC reaction. The interface between the sections comprises a bond line. Due to very high expansion as diamond reacts to form SiC, a low residual Si content bond line is produced, having 25% by weight of silicon or less. Because there is no "glue", there is no glue bead that enters channel and thus the channel stays substantially clear of excess material (e.g. no excess silicon present in the channel). Varying the time and temperature can have different results.

Carbon can exist in several forms, such as carbon black, graphite and diamond. Diamond is a high density form of carbon and given a specific volume contains more moles of carbon with respect to other forms of carbon. Thus, expansion (volume increase) upon Si+Diamond→SiC reaction is high, allowing gap between preforms to be filled. The supply of silicon is in excess of what the diamond can react with. FIG. 4 is a table showing the characteristics of various forms of carbon.

As discussed above, green parts can be made by making a slurry with water and a carbon based binder which is shaped in a mold (or cast into a brick for later machining). The slurry is frozen, dried or both in order to remove solvent and solidify the green part. Then a drying/carbonization procedure takes place; this may occur under a nitrogen atmosphere. In some embodiments, the temperature range for this step is from about 500° F. to about 700° F. During the carbonization procedure the carbon based binder is broken down.

After the green parts (green bodies) are created, two or more preform pieces are assembled to make a finished ceramic component. This step usually occurs in a vacuum furnace. Dry diamond powder is applied to the interface of two or more preformed pieces and heat is applied (usually along with vacuum). Heat is applied until the melting temperature of silicon is reached (~1,410° C.) or above.

When used to create components that have internal channels, utilization of diamond powder at the interface of two or more preformed pieces instead of SiC-based glue allows for reaction bonding without the presence of excess material in the channel. The diamond powder is directly applied to the bonding surface of two or more preformed pieces and may be applied to the surface of the preformed pieces by simple brushing (e.g. "painting on" with a brush), or by other methods. Other methods of applying the diamond powder include, but are not limited to, screen printing; using low vapor pressure liquid as a carrier; powder coating (if diamond is small enough particle size); dusting; tackifying surface with an aerosol to affix diamond above a certain size (10 μm). In some embodiments, masking may be used to prevent the diamond powder from entering the channel.

Figure 5:
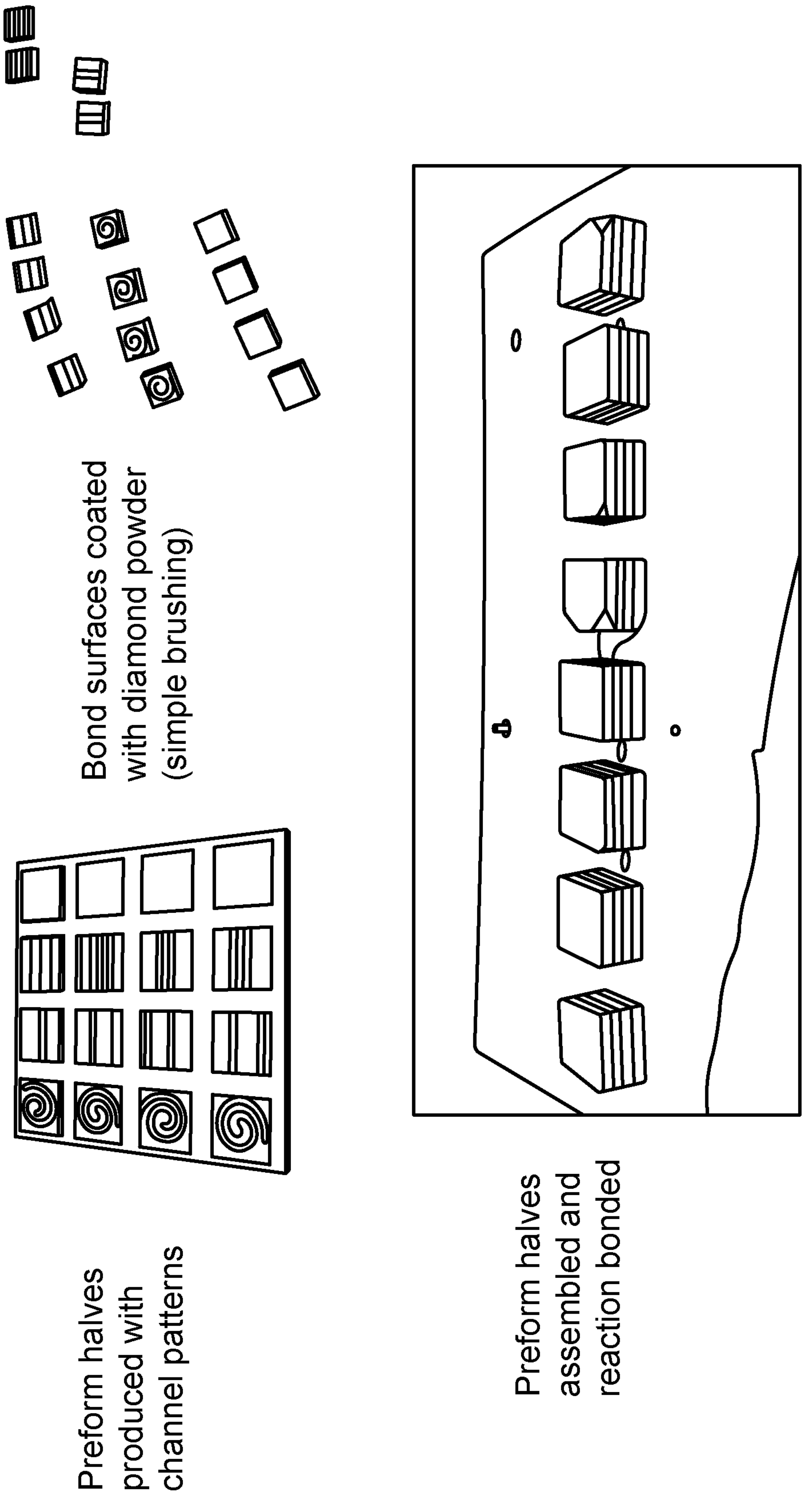
FIG. 5 illustrates steps of using diamond powder at the interface of preformed sections to create components that have internal channels, in accordance with an example embodiment of the disclosure.

In some embodiments of the disclosed method, preforms with half channels are prepared, and bonding surfaces are then coated with diamond powder (by brushing the powder onto the surface). Next, preform halves are assembled and subsequently reaction bonded. The microstructure of the bond line may then be examined. FIG. 5 illustrates steps of using diamond powder at the interface of preformed sections to create components that have internal channels. In some embodiments, the bonding surface includes all surfaces between two or more matching pieces (except for any internal channels). In other embodiments, the bonding surface may include a portion of the surfaces between two or more matching pieces (except for any internal channels).

Figure 6:
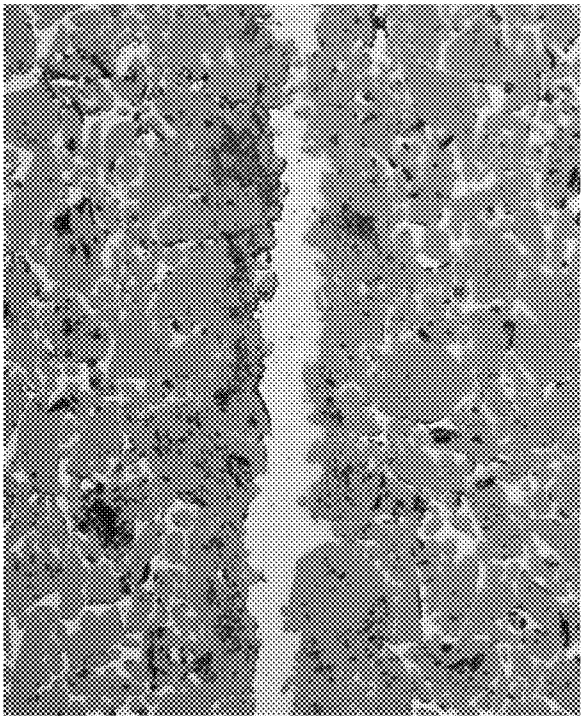
FIG. 6 shows a control sample that has preform halves reaction bonded with no diamond at the interface, in accordance with an example embodiment of the disclosure.

A control sample was created for comparison with nothing at the interface. To create this control, two preforms were placed on top one another (only air or space between them) and the process was run. In this control sample, the gap ends up being filled with Si metal. A Si bond line is not ideal; this bond may have low strength; low stiffness and/or increased susceptibility to corrosion (Si more susceptible to corrosion than SiC). FIG. 6 shows a control sample that has preform halves reaction bonded with no diamond at the interface. The gap in FIG. 6 is due to the uneven surface provided from machining these parts in the green state. The unacceptable Si bond line is shown. This bond is unacceptable because it is weak and the Si is prone to corrosion.

Further example methods of fabrication are generally described below, and the characteristics of reaction bonded silicon carbide (RB—SiC) ceramic components may be evaluated.

The diamond powder used at the interface may have a variety of particle sizes. In some embodiments, the particle size of the diamond powder is between about 3 μm and 200 μm; in other embodiments, the particle size of the diamond powder is between about 3 μm and 150 μm; about 3 μm and 100 μm; about 3 μm and 50 μm; about 10 μm and 200 μm; about 50 μm and 200 μm; or about 100 μm and 200 μm. In one embodiment, the particle size of the diamond powder is between about 3 μm and 30 μm; in another embodiment, the particle size of the diamond powder is between about 3 μm and 10 μm. Less SiC may be formed from larger sizes given the time above the melting point of Si is constant.

Figure 7:
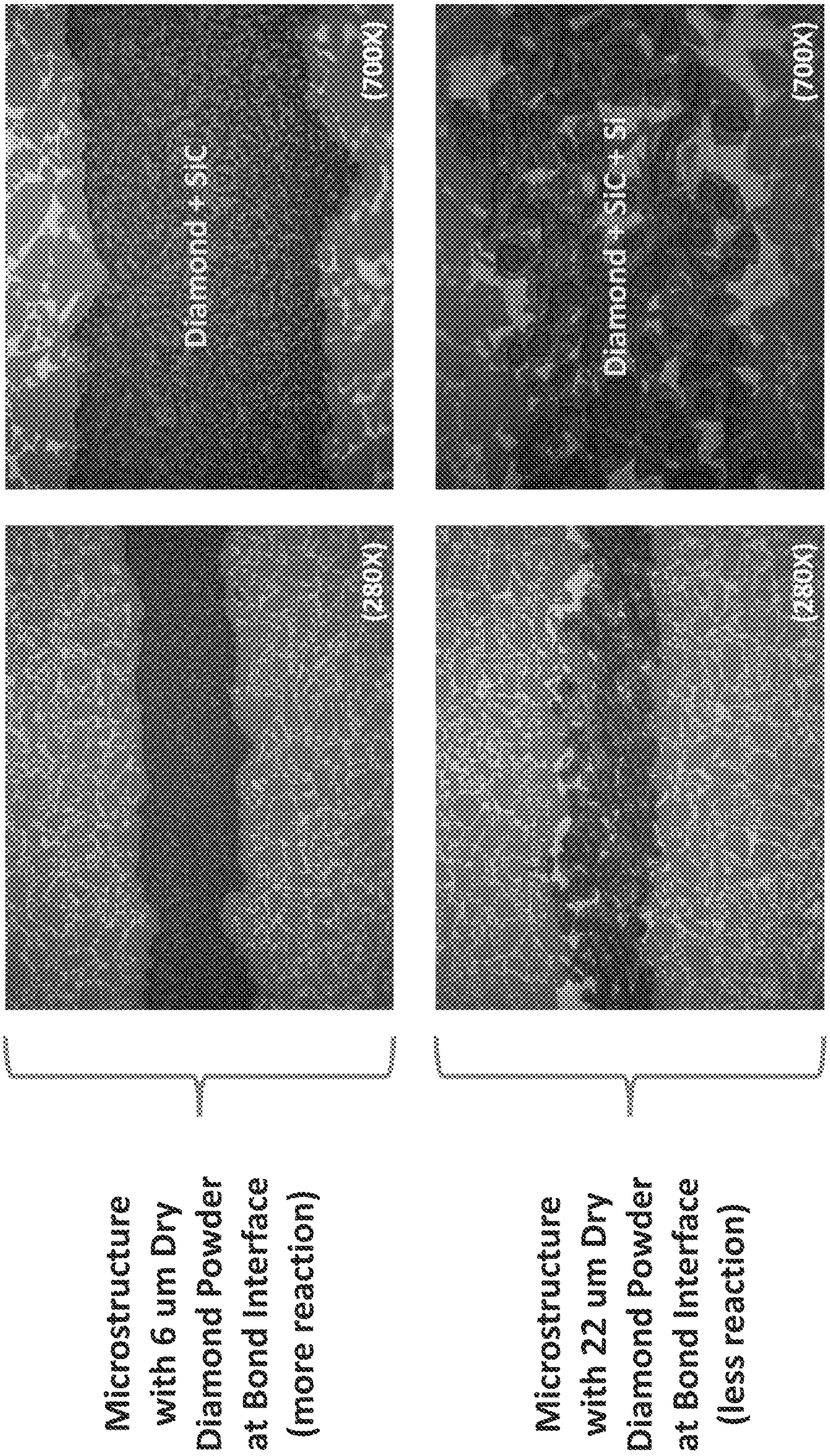
FIG. 7 shows the microstructure of the bond for samples made with two different diamond particle sizes at the interface, in accordance with an example embodiment of the disclosure.

FIG. 7 shows the microstructure of the bond line for samples made with two different diamond particle sizes at the interface: 6 μm and 22 μm. For both samples, a satisfactory bond interface (bond line) is achieved, although more reaction is seen with the 6 μm sample. In this case satisfactory indicates complete infiltration, i.e. no pores, and a low amount of Si which means less corrosion in expected environments, along with other advantages.

Higher surface area 6 μm diamond powder results in higher levels of the Si+C→SiC reaction (more reaction), creating a bond line of SiC and diamond having little or no Si present in the bond line. A bond line having reduced amounts of Si present is desired for increased stiffness and corrosion resistance, as well as preventing Si from bleeding into any channel features.

In some embodiments, the reduced amount of Si correlates with 25% by weight or below of Si remaining, with a lower limit of 0% Si (none detectable). In other embodiments, 20% by weight or below of Si is remaining; 15% by weight or below of Si is remaining; 10% by weight or below of Si is remaining; 5% by weight or below of Si is remaining; 1% by weight or below of Si is remaining; 0.5% by weight or below of Si is remaining; or 0.1% by weight or below of Si is remaining. In some embodiments, there is no detectable silicon present (0% remaining).

The silicon can also be measured in the opposite manner, that is, by the amount of Si that is reacted away (removed by reaction) during the reaction bonding process. In some embodiments, the reduced amounts of Si correlates with 75% by weight or below of Si removed, with a lower limit of 100% Si removed (none detectable). In other embodiments, 80% by weight or below of Si is removed; 85% by weight or below of Si is removed; 90% by weight or below of Si is removed; 95% by weight or below of Si is removed; 99% by weight or below of Si is removed; 99.5% by weight or below of Si is removed; or 99.9% by weight or below of Si is removed. In some embodiments, there is no detectable silicon present (100% removed).

Less reaction occurs with lower surface area 22 μm diamond, resulting in a bond line of SiC, diamond and residual Si. Some of the Si present may be due to the fact that the 6 μm diamond powder better fits in between the grains on the preform's bonding surface than the 22 μm diamond powder.

For example the surface area (or surface available for reaction) in a given volume is calculated as follows:

$$\frac{SA(d = 3\ um)}{SA(d = 6\ um)} = 4$$

-continued $$\frac{SA(d = 6\ um)}{SA(d = 22\ um)} = 1.8\overline{33}$$

$$\frac{SA(d = 3\ um)}{SA(d = 22\ um)} = 7.\overline{33}$$

Where SA stands for surface area and d stands for diameter. The ratios provide a representation of how much more reactive the various particle sizes may be from a strictly size argument.

Advantages of using diamond powder at the interface can include, for example, 1) Ability to form bond line in internally channeled reaction bonded ceramic without a glue bead therein (advantageous for enhanced flow behavior and ability to form parts with ultra-small channel sizes); 2) Ability to form bond line void of Si via SiC+Diamond→SiC reaction (reacting away most if not all of the Si; this is advantageous for corrosion resistance and increased stiffness, as well as preventing Si from bleeding into any channel features); and/or 3) Enhanced manufacturing efficiency (no need to prepare SiC-based glue, no labor to apply glue to preforms).

Applications of this bonding technique may be used for ceramics where internal cooling channels are needed. In particular value are applications with small channel sizes or where corrosion with Si would be an issue. Key fields include but are not limited to water-cooled thermal management components; water cooled semiconductor wafer chucks and electrostatic chucks; heat exchanger; Petrochem valve bodies; and/or high energy laser mirrors.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "etc.", "e.g.," and "for example" set off lists of one or more non-limiting examples, instances, or illustrations.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of making reaction bonded silicon carbide (RB—SiC) ceramic components having one or more internal channels comprising:

producing preform pieces with surface channels comprising SiC;

placing diamond powder on a bonding surface of said preform pieces;

assembling said preform pieces; and reaction bonding said preform pieces to yield said ceramic components having internal channels;

wherein reaction bonding comprises infiltration of molten Si into said preform pieces where the molten Si reacts with the diamond to form additional SiC and the reaction bonding results in a bond line between said preform pieces; and a majority of Si is removed from said bond line by the reaction.

2. The method of claim 1, wherein said preform pieces comprise two halves of a final ceramic component.

3. The method of claim 2, wherein said preform pieces comprise a body portion and a cover portion.

4. The method of claim 1, wherein 75% or more of the Si is removed from said bond line by reaction.

5. The method of claim 4, wherein 85% or more of the Si is removed from said bond line by reaction.

6. The method of claim 5, wherein 95% or more of the Si is removed from said bond line by reaction.

7. The method of claim 6, wherein there is no detectable silicon present in said bond line.

8. The method of claim 1, wherein said one or more internal channels contain no excess silicon.

9. The method of claim 1, wherein said diamond powder has a particle size of between about 3 μm and 30 μm.

10. The method of claim 9, wherein said diamond powder has a particle size of between about 3 μm and 10 μm.

11. The method of claim 1, wherein no vehicle or carrier is used for said diamond powder.

12. The method of claim 1, wherein placing the diamond powder comprises directly applying the powder to said preform pieces.

13. The method of claim 1, wherein reaction bonding said preform pieces comprises applying heat.

14. The method of claim 13, wherein applying heat occurs under vacuum.

15. A reaction bonded silicon carbide (RB—SiC) ceramic component made by the method of claim 1.

* * * * *